United States Patent
Hufnagel

(10) Patent No.: US 6,666,459 B1
(45) Date of Patent: Dec. 23, 2003

(54) RADIAL SHAFT SEAL

(75) Inventor: Werner Hufnagel, Grossbettlingen (DE)

(73) Assignee: Firma Carl Freudenberg, Weinheim (DE)

( * ) Notice: Subject to any disclaimer, the term of this patent is extended or adjusted under 35 U.S.C. 154(b) by 0 days.

(21) Appl. No.: 09/543,977

(22) Filed: Apr. 6, 2000

(30) Foreign Application Priority Data

Apr. 6, 1999 (DE) .......................... 199 15 467

(51) Int. Cl.[7] ................................ F16J 15/32
(52) U.S. Cl. .................... 277/572; 277/577; 277/576
(58) Field of Search ........................... 277/559, 560, 277/570, 556, 577, 576, 572, 565, 551

(56) References Cited

U.S. PATENT DOCUMENTS

| | | | | |
|---|---|---|---|---|
| 3,984,113 A | * | 10/1976 | Bentley | 277/559 |
| 4,118,856 A | * | 10/1978 | Bainard et al. | 29/511 |
| 4,243,235 A | * | 1/1981 | Repella | 277/152 |
| 4,336,945 A | * | 6/1982 | Christiansen et al. | 277/153 |
| 4,432,557 A | * | 2/1984 | Drucktenhengst | 277/153 |
| 4,522,411 A | * | 6/1985 | Burgan | 277/134 |
| 4,568,092 A | * | 2/1986 | Hayashida et al. | 277/152 |
| 4,695,063 A | * | 9/1987 | Schmitt et al. | 277/134 |
| 4,709,930 A | * | 12/1987 | Forch | 277/68 |
| 5,462,287 A | * | 10/1995 | Hering et al. | 277/37 |
| 5,577,741 A | * | 11/1996 | Sink | 277/153 |
| 5,615,894 A | * | 4/1997 | vom Schemm | 277/134 |
| 5,692,757 A | * | 12/1997 | Staub | 277/134 |
| 5,758,881 A | * | 6/1998 | Stanley | 277/552 |
| 5,791,658 A | * | 8/1998 | Johnston | 277/559 |
| 5,860,656 A | * | 1/1999 | Obata et al. | 277/559 |
| 6,102,409 A | * | 8/2000 | Furuyama et al. | 277/562 |

FOREIGN PATENT DOCUMENTS

DE        867 189        12/1952

* cited by examiner

*Primary Examiner*—William Miller
(74) *Attorney, Agent, or Firm*—Kenyon & Kenyon

(57) ABSTRACT

A radial shaft seal includes a supporting ring which is attached to at least one sealing ring made of a polymer material. The sealing ring has at least one sealing lip and an additional gasket is arranged on the side of the sealing lip facing away from the space to be sealed. The supporting ring is designed in one piece and has two radial projections arranged next to one another with an axial distance between them, where a circular additional gasket produced separately is arranged without adhesion in the gap formed by this distance and is under axial tension.

12 Claims, 3 Drawing Sheets

RADIAL SHAFT SEAL

BACKGROUND OF THE INVENTION

The present invention relates to a radial shaft seal which includes a supporting ring which is attached to at least one sealing ring made of a polymer material, where the sealing ring has at least one sealing lip and an additional gasket is arranged on the side of the sealing lip facing away from the space to be sealed.

Such a radial shaft seal is known from German Patent 867189. The additional gasket described therein is designed as a dust seal and is held in a rotationally fixed manner in a multipart gasket housing. The multipart gasket housing has a pressure ring and a spacer ring which applies tension to the supporting ring with the metallic housing jacket. A felt washer designed as a dust seal is arranged between a radial wall of the housing jacket and the supporting ring or an elastomer coating of the supporting ring, where the supporting ring or the coating is designed with a nubby grip element for the felt washer. However, it should be pointed out that the previously known radial shaft seal is composed of a number of individual parts that must be assembled, which is not very satisfactory from the standpoint of both economy and manufacturing technology.

SUMMARY OF THE INVENTION

The object of the present invention is to further develop a radial shaft seal of the type noted above such that it is made of fewer individual parts and can be manufactured less expensively and more easily from the standpoint of economy and manufacturing technology.

To achieve this object, the supporting ring is designed in one piece and has two radial projections arranged next to one another with an axial distance between them, and a circular additional gasket produced separately is arranged without adhesion in the gap formed by this distance and is under axial tension. Such a radial shaft seal has a simple design and can be produced inexpensively and without problem. The radial projections form a one-piece component of the supporting ring on which the sealing ring is integrally molded. The supporting ring is preferably made of a metal material.

The first radial projection facing the space to be sealed is preferably covered at least partially by a coating of polymer material on the side facing the second radial projection, where the additional gasket is under axial tension with the coating. Such a radial shaft seal is produced by the fact that after vulcanization of the polymer material on the supporting ring, the second radial projection is flanged toward the inside with the insertion of the additional gasket from the axial direction first to the radial direction such that the additional gasket is arranged under an axial tension between the second radial projection and the coating. In combination with the axial tension with which the additional gasket is arranged between the two radial projections, the coefficient of friction of the polymer, preferably elastomer, material of the coating causes a rotationally fixed arrangement of the additional gasket relative to the supporting ring. There is a relative movement of the additional gasket which is subject to friction only on the surface to be sealed.

The additional gasket is preferably made of an open-pore filter material, such as a nonwoven. It is advantageous here for the additional gasket to be permeable to air, so there is no possibility of a vacuum developing between the additional gasket and the sealing lip. The air permeability of the additional gasket has proven especially advantageous if the sealing lip of the sealing ring is provided with a reverse twist to return the medium to be sealed, which is used for cooling and lubrication of the sealing lip, back in the direction of the space to be sealed. Even with a reverse conveyance of the medium to be sealed in the direction of the space to be sealed, no vacuum develops between the additional gasket and the sealing lip relative to the environment. Therefore, the seal remains good during a long service life of the radial shaft seal.

The sealing ring and the coating are preferably each made of an elastomer material. Suitable materials include preferably acrylate rubber (ACM) or fluoropolymers (FPM). The advantage of a sealing ring and a coating of ACM is that the costs are lower than when using FPM and efficiency is good.

However, it is advantageous that when using FPM, the service life is increased with a very good efficiency.

Depending on the use conditions, it is also possible to use the materials acrylonitrile butadiene rubber (NBR), silicone rubber (MVQ), polytetrafluoroethylene (PTFE) or combinations thereof.

Production of the radial shaft seal according to the present invention is simplified if the sealing ring and the coating are each made of the same material and are designed in one piece, with one developing into the other. Both the sealing ring and the coating can then be molded at the same time onto the supporting ring especially easily in one operation and then vulcanized.

Depending on the respective application, however, there is also the possibility that the sealing ring and the coating are made of different elastomer materials. Despite the different materials in such a case it is also possible to mold the different materials onto the supporting ring at the same time and to vulcanize them.

The supporting ring is preferably made of a deep-drawable metal material. The supporting ring can then be manufactured easily and inexpensively. A very stable bond is obtained after vulcanization of an elastomer material for the sealing ring and the coating. Alternatively, other tough materials such as polymer materials may also be used to manufacture the supporting ring.

The first radial projection may be attached to a first axial projection on the inside radially and the second radial projection may be attached to a second axial projection on the outside radially, with the axial projections being designed so that they develop into one another through a 180° arc on the side facing away from the radial projections.

The inner circumference of the second axial projection is preferably in contact with the outer circumference of the first axial projection. The supporting ring thus has extremely good dimensional stability, which is especially advantageous with regard to providing an accurate allocation of the two radial projections and the additional gasket arranged between them under axial tension.

The outer circumference of the additional gasket is in contact with the inner circumference of the second axial projection. This ensures good centering of the additional gasket.

Due to the arrangement of the additional gasket between the two radial projections without adhesion, where the additional gasket is held exclusively by axial tension, it is generally advantageous that no problems occur due to bonding of the additional gasket in manufacturing the radial shaft seal. Since the additional gasket is not glued, the bonding cannot be loosened when the radial shaft seal is exposed to high temperatures and aggressive media.

BRIEF DESCRIPTION OF THE DRAWINGS

Three embodiments of radial shaft seals constructed according to the principles of the invention are illustrated in FIGS. 1 through 3.

The figures show schematic diagrams of the embodiments.

DETAILED DESCRIPTION OF THE INVENTION

Figure 1:
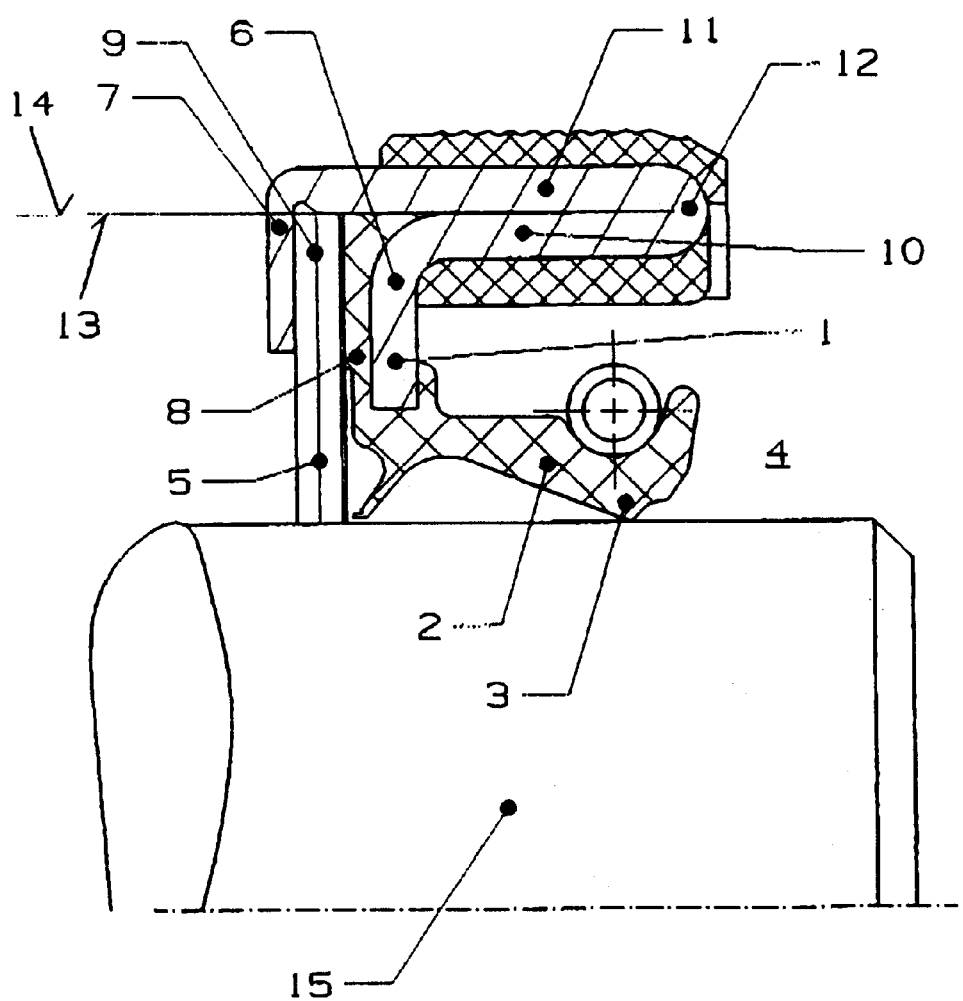
FIG. 1 is a cross-sectional view of a first embodiment of the invention.

FIG. 1 shows an embodiment of the radial shaft seal according to the present invention. The radial shaft seal has a sealing ring 2 made of an elastomer material which is vulcanized onto supporting ring 1. Supporting ring 1 is made of a metal material in one piece. Furthermore, the radial shaft seal includes an additional gasket 5 which is clamped axially between two radial projections 6, 7 of the supporting ring. Two radial projections 6, 7 are designed in one piece with supporting ring 1, with first radial projection 6 on the side facing second radial projection 7 being covered completely by coating 8 of an elastomer material. The thickness of the material of second radial projection 7 is less than that of first radial projection 6, to achieve a simple plastic deformation in the form of a flange projecting radially toward the inside.

The additional gasket 5 is made of an air-permeable nonwoven, thus preventing a vacuum from developing between sealing lip 3 and additional gasket 5 even when the medium to be sealed is conveyed back in the direction of space 4 to be sealed. In this embodiment, sealing ring 2 and coating 8 are made of the same material and are designed in one piece, with one developing into the other, with coating 8 and second radial projection 7 each extending over approximately half the radial extent of additional gasket 5. This guarantees a secure, rotationally fixed allocation of additional gasket 5 relative to supporting ring 1 and coating 8.

Additional gasket 5 is centered on its outer circumference due to the fact that it is in contact with inner circumference 13 of second axial projection 11.

Due to the one-piece design of supporting ring 1, with two radial projections 6, 7 forming a part of supporting ring 1, the design of the radial shaft seal uses only a few parts, so it can be manufactured easily and inexpensively.

Figure 2:
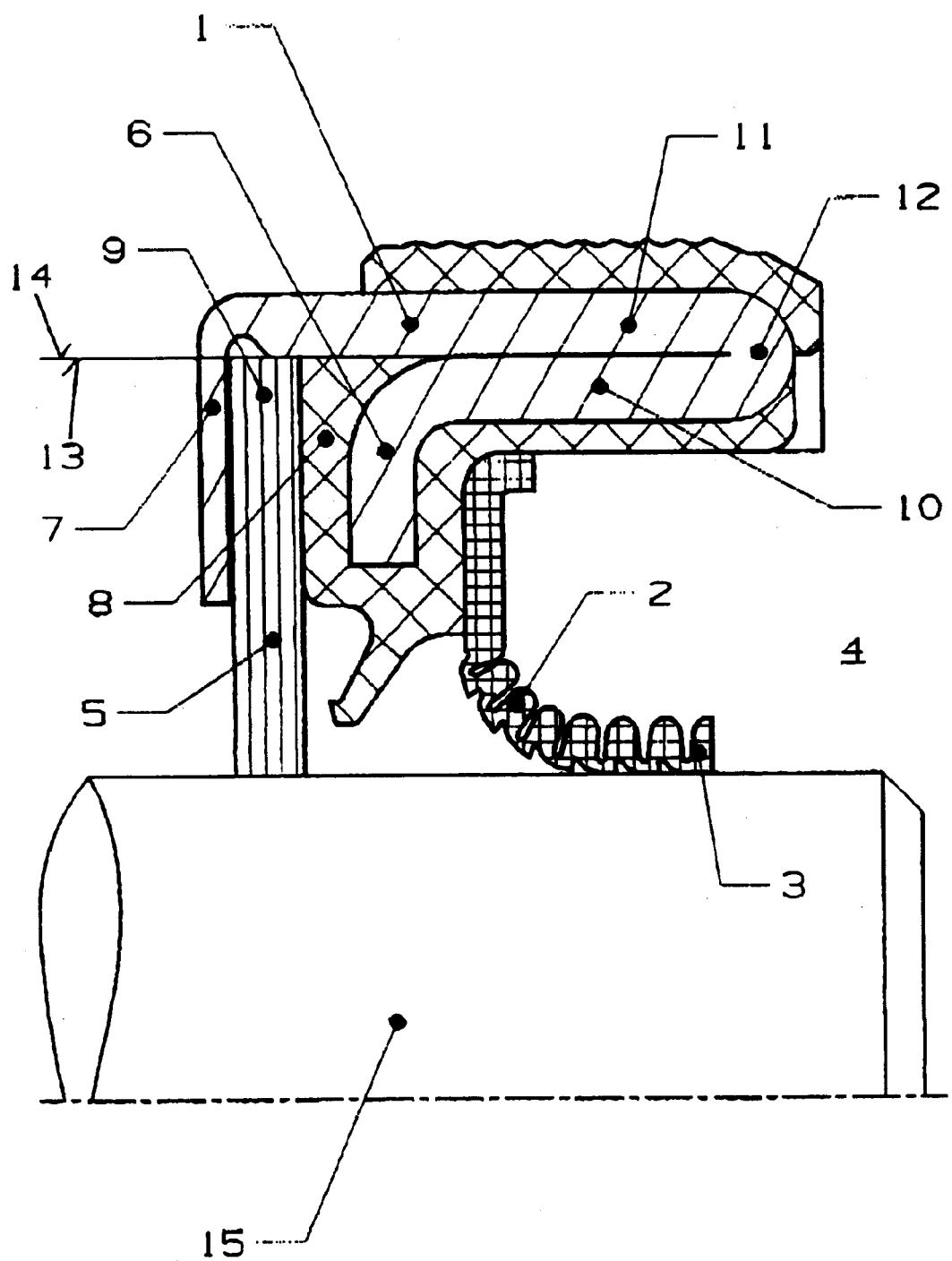
FIG. 2 is a cross-sectional view of a second embodiment of the invention.

FIG. 2 shows an alternative embodiment, where sealing ring 2 is made of PTFE.

Figure 3:
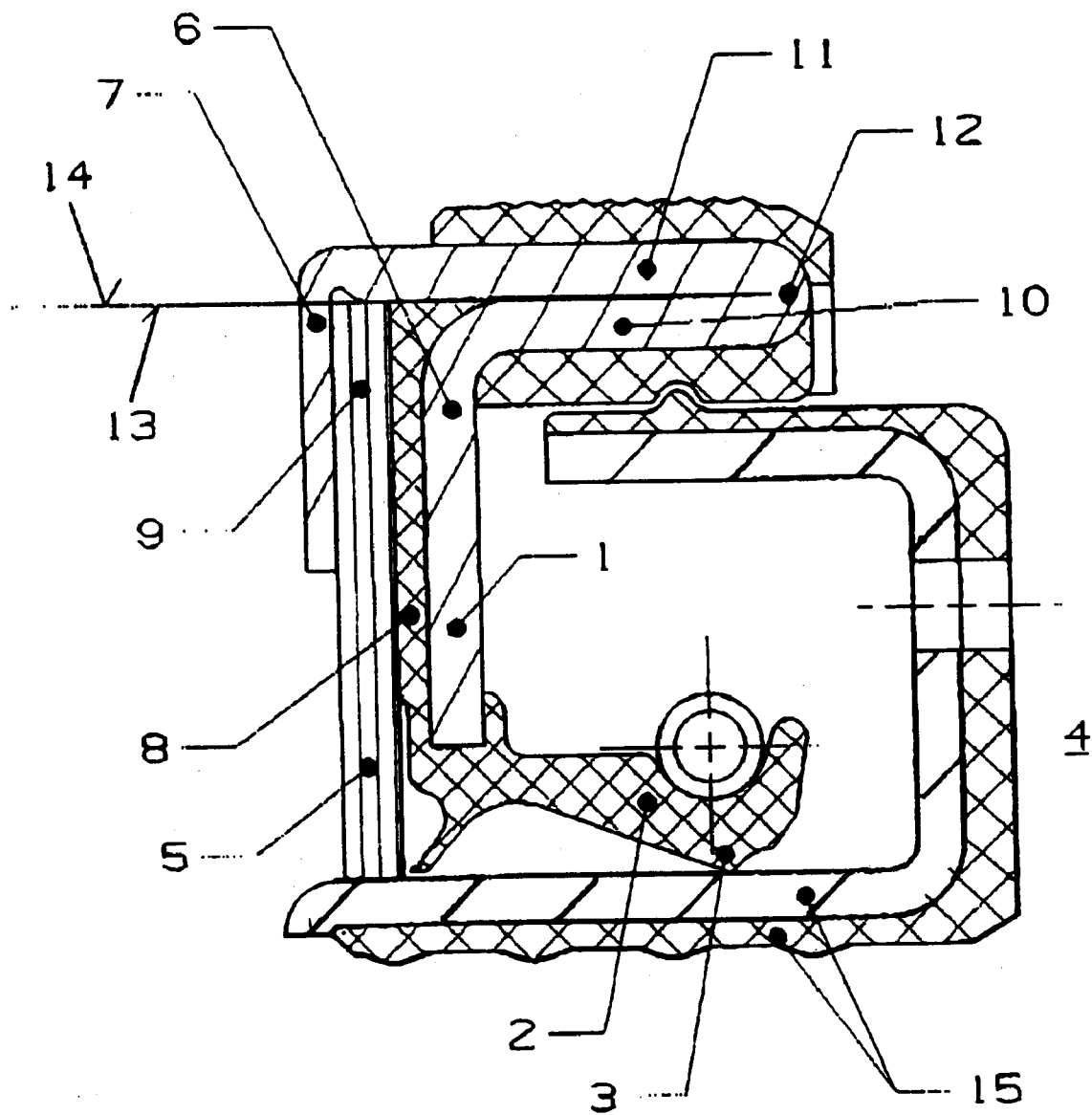
FIG. 3 is a cross-sectional view of a third embodiment of the invention.

FIG. 3 shows the radial shaft seal according to FIG. 1, where opposing face 15 for sealing lip 3 is integrated.

What is claimed is:

1. A radial shaft seal, comprising:
   at least one sealing ring made of a polymer material, the sealing ring comprising at least one sealing lip;
   a supporting ring that is attached to the at least one sealing ring, the supporting ring having first and second radial projections attached, respectively, to and contiguous with first and second axial projections that develop into one another through a 180 degree arc wherein the radial projections are arranged next to one another with an axial distance between them and wherein the first radial projection is covered at least partially on a side facing the second radial projection by a coating of an elastomeric polymer material, which coating is contiguous with and develops into the sealing ring that is made of the same elastomeric polymer; and
   an additional, circular gasket arranged without adhesion in a gap defined by the two radial projections of the supporting ring, the circular gasket being under axial prestress and contacting a shaft to be sealed,
   the additional gasket being made of an open-pore filter material and extending past the first and second axial projections.

2. The radial shaft seal according to claim 1, wherein the additional gasket is under axial prestress with the coating.

3. The radial shaft seal according to claim 1, wherein the supporting ring is made of a deep-drawable metal material.

4. The radial shaft seal according to claim 1, wherein the outer circumference of the additional gasket is in contact with an inner circumference of the second axial projection.

5. The radial shaft seal according to claim 1, wherein the first and second axial projections are in contact with each other.

6. The radial shaft seal according to claim 1, further comprising an opposing surface to the sealing lip, integrated into the radial shaft seal.

7. A radial shaft seal, comprising:
   a sealing ring having a sealing lip, the sealing ring made of a polymer material;
   a supporting ring coupled to the sealing ring, the supporting ring being a continuous piece and formed to define a first and a second radial projection, the first radial projection contiguous with a first axial projection, the second radial projection contiguous with a second axial projection, the first axial projection developing into the second axial projection, the first radial projection covered at least partially on a side facing the second radial projection by a portion of the sealing ring; and
   a sealing gasket having a first end and second end, the first end held under a compressive force between the first radial projection and the second radial projection, the second end extending beyond the first and second radial projections and extending towards the radial shaft, the sealing gasket being made of an open-pore filter material.

8. The radial shaft seal of claim 7 wherein the second end of the sealing gasket is in contact with the radial shaft.

9. The radial shaft seal of claim 8 wherein the gasket forms a dust seal with the radial shaft.

10. The radial shaft seal of claim 7 wherein the thickness of the first radial projection is different from the thickness of the second radial projection.

11. The radial shaft seal of claim 7 wherein the first axial projection and the second axial projection develop into one another through a 180 degree arc and wherein the radial projections are arranged next to one another.

12. A radial shaft seal comprising:
   a sealing ring having a sealing lip, the sealing ring made of a polymer material;
   a supporting ring coupled to the sealing ring, the supporting ring being a continuous piece and formed to define a first and a second radial projection, the first radial projection contiguous with a first axial projection, the second radial projection contiguous with a second axial projection, the first axial projection developing into the second axial projection, the first radial projection covered at least partially on a side facing the second radial projection by a portion of the sealing ring; and a sealing gasket having a first end and second end, the first end held under a compressive force between the first radial projection and the second radial projection, the second end extending beyond the first and second radial projections and extending towards the radial shaft, wherein the first axial projection is also covered with a sealant, the sealant made of different material than the sealing ring.

* * * * *